United States Patent [19]

Shioda et al.

[11] Patent Number: 4,717,265

[45] Date of Patent: Jan. 5, 1988

[54] SUPPORTING MECHANISM OF A LINEARLY MOVABLE BEARING

[75] Inventors: Toshimi Shioda; Minoru Noda; Masahide Nagai; Masatoshi Higake; Yutaka Makishima; Kazutoshi Yokose, all of Tokyo, Japan

[73] Assignee: Seiko Instruments & Electronics Ltd., Tokyo, Japan

[21] Appl. No.: 860,124

[22] Filed: May 6, 1986

[30] Foreign Application Priority Data

May 7, 1985 [JP] Japan .................................. 60-96511

[51] Int. Cl.$^4$ ............................................. F16C 29/04
[52] U.S. Cl. .......................................... 384/49; 384/30
[58] Field of Search .................. 384/7, 10, 29, 30, 46, 384/49-52

[56] References Cited

U.S. PATENT DOCUMENTS

| | | | |
|---|---|---|---|
| 2,198,039 | 4/1940 | Onions et al. | 384/49 |
| 2,422,775 | 6/1947 | Conner | 384/30 |
| 2,833,598 | 5/1958 | Sloyan | 384/49 |
| 2,981,571 | 4/1961 | Martens | 384/49 |
| 3,003,827 | 10/1961 | Hentschke | 384/49 |
| 3,043,634 | 7/1962 | Coley | 384/49 |
| 3,253,868 | 5/1966 | Danly | 384/30 |
| 3,357,755 | 12/1967 | Danly | 384/49 |
| 4,408,806 | 10/1983 | Orain | 384/50 |

FOREIGN PATENT DOCUMENTS

| | | | |
|---|---|---|---|
| 617221 | 2/1949 | United Kingdom | 384/49 |
| 2158165 | 11/1985 | United Kingdom | 384/52 |

Primary Examiner—Stuart S. Levy
Assistant Examiner—Thomas R. Hannon
Attorney, Agent, or Firm—Bruce L. Adams; Van C. Wilks

[57] ABSTRACT

A support mechanism for a cylindrical coordinate type industrial robot comprising a stationary upstanding tubular outer member and a displaceable inner member supported within the outer member to undergo axial displacement in upward and downward directions and angular displacement in clockwise and counterclockwise directions. The supporting mechanism includes a bearing interposed between the inner and outer members, the bearing including a retaining member rollably retaining thereon a plurality of rollable elements. An elastic balancing and restoring device for applying elastic biasing forces in opposite axial directions to the upper and lower ends of the retainer member is operative in the event the retainer member fails to maintain proportionate displacement with the inner member to temporarily increase the magnitude of the force difference between the oppositely directed elastic biasing forces in a direction effective to restore the proportionate displacement.

7 Claims, 5 Drawing Figures

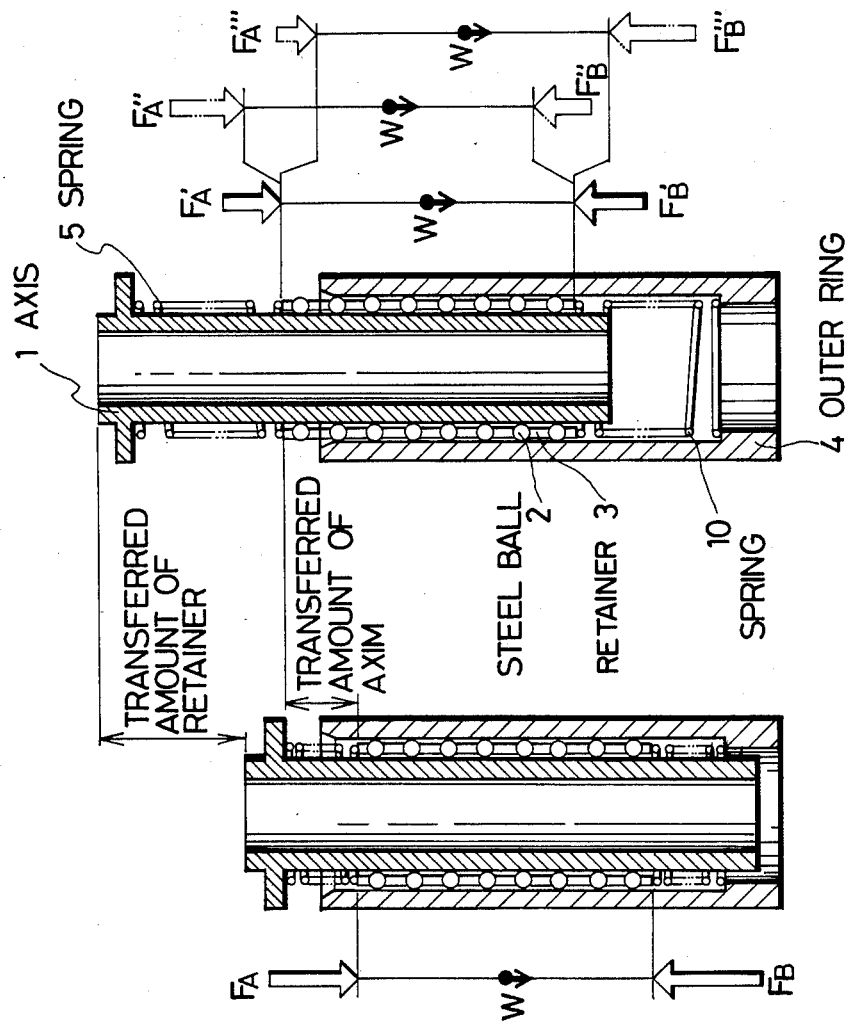

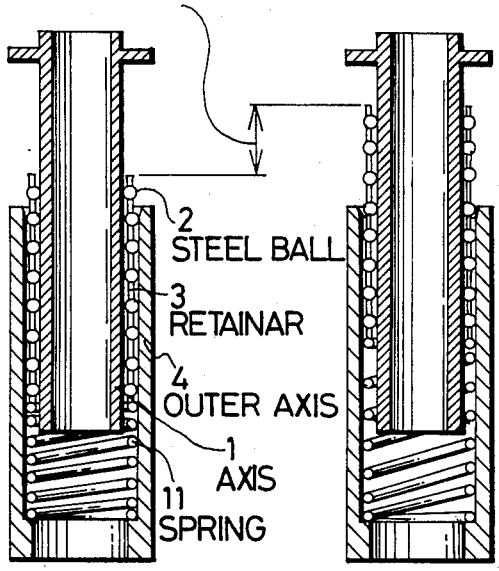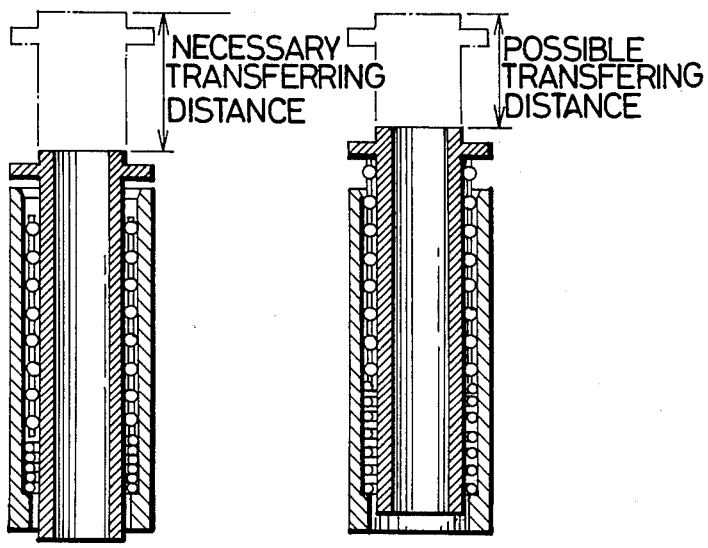

SUPPORTING MECHANISM OF A LINEARLY MOVABLE BEARING

BACKGROUND OF THE INVENTION

The present invention relates to a supporting mechanism for a linearly movable bearing which comprises a rotating unit retainer or bearing race.

The present invention is to stabilize the rolling unit and its elastic forces in two directions, by always giving elastic force from two directions of the linear motion to the retainer, in a linearly movable bearing comprising a rolling unit retainer.

[PRIOR ART]

In a linearly movable bearing comprising a rotating unit retainer, the rolling unit retained in the retainer lies between a pair of tubular members or cylinders comprising a track, and the rolling unit supports the relative motion of the two tubes or cylinders by rotation. Therefore, when the two cylinders conduct linear motion relative to one another, the rolling unit and the retainer are transported for half the amount of the relative movement of the track. Thus, relative linear motion occurs between the rolling unit and the track. For the purpose of mechanical stoppers and the like to prevent disconnection from the track components, the transferrable distance of the rolling unit and the retainer is fixed, and accordingly the transferrable distance of the bearing is fixed.

Also, when vertically utilizing the linear motion directions of the linearly movable bearing which comprises a rolling unit retainer, the rolling unit which rolls between the two track tubular members slips by the tare of the rolling unit and the retainer, and it is clear that a gap or failure to return to design position is caused by this operation. Therefore, the present invention includes a method to provide a force to the bearing retainer with springs, to oppose the weight of the rolling unit and the retainer.

In the prior art there occurs a problem that a gap is caused in a case when the linear motion direction is horizontally utilized, and it is impossible not to cause any gap of the rolling unit even when the weight of the rolling unit and the retainer is supported by springs, because of disproportions of the track, such as partial loads caused by the degree of parallel movement and pressurization of the track.

FIG. 5 shows a simplified conventional prior art embodiment. A practical explanation of the problems caused by the gap or failure to return to designed position of the rolling unit referred to in FIG. 5 is as follows. Numeral 1 shows a tube or cylinder comprising a displaceable inner member and referred to in the drawings generically as an axis which is one of the two track components of the rolling unit. Numeral 2 indicates a steel ball rollable elements being the rolling surfaces of the rolling unit. Numeral 3 is a retainer member which retains the steel ball rollable elements in the rolling unit. Numeral 4 is an outer tubular member referred to generically as an outer axis which is the track surface of the steel ball rollable elements 2 together with tube 1. Numeral 11 is a spring to support the weight of steel ball elements 2 and retainer 3. FIG. 5(a) shows an embodiment when steel ball elements 2 and retainer 3 are in their proper position, and FIG. 5(b) shows the necessary transfer or translation distance for axis 1 to move downwards. FIG. 5(c) shows a condition where steel ball elements 2 and retainer 3 are displaced from their proper positions and the difference in positions is defined herein as the gap. FIG. 5(d) shows the transferred distance of axis 1 corresponding to FIG. 5(b). Referring to FIG. 5(d), the upper end diameter portion of axis 1 and the upper end portion of retainer 3 have come to a collision before tube 1 is moved to the proper position shown in FIG. 5(b) which shows the necessary transferring distance, and thus it is not possible to move further in the proper downwards direction.

SUMMARY OF THE INVENTION

To solve the above problems, in the present invention, an elastic unit, with equal elastic coefficient comprising elastic balancing and restoring means is provided in between each of the two ends of the linear movement direction of the retainer and also between the two tubular members comprising the track. Thus, a force is always added from both directions of the linear movement, the retainer is supported, and thus any undesired gap of the rolling unit is prevented.

With the above construction, the force from both directions of linear movement falling onto the rolling unit through the retainer can be made constant despite the variation of the relative movement of the track components. When the force from both directions of the linear motion becomes uneven by the gap of the rolling unit, there occurs a force in the opposite direction to the gap as the rolling unit, and the rolling unit will be pushed back to its proper position when this force becomes stronger than the frictional force occurring between the rolling unit and the two track components. Also, when the linear motion direction is utilized vertically, the mechanism operates similarly by balancing the system including the weight of the rolling unit and the retainer.

The same effect is obtainable by utilizing elastic units such as pulling springs instead of two compression springs.

BRIEF DESCRIPTION OF THE DRAWINGS

The drawings show the embodiments of the present invention.

FIG. 4 is a sectional diagram which encompasses a simplified drawing of FIG. 3, to further explain the operation of the mechanism of the invention.

FIG. 5 is a sectional diagram which shows a simplified conventional mechanism, to facilitate an explanation of the problems of the prior art mechanism.

Referring to FIG. 1, the arrows show the directions of linear movement and rotation in the operation of the cylindrical coordinate type industrial robot of the present invention.

Referring to FIGS. 2, 3 and 4, reference numeral 1 is an axis or tubular member which supports the upper portion, that is the arm portion 12 of a cylindrical coordinate type industrial robot. The arm support tube is one of the two components defining a track of a rolling unit comprised of displaceable tubular member 1 mounted for linear reciprocation within retainer or bearing race 3 mounting steel ball elements 2. Numeral 2 points to steel ball elements acting as the rollers of the rolling unit, and member 3 is the rolling unit retainer or bearing race. Numeral 4 points to the outer stationary support cylinder or ring which slidably supports and guides the rolling unit. Member 5 is an upper spring provided between retainer 3 and an upper flange part 13 of tube 1. Spring catcher 6 and thrust bearing 7 are mounted between the upper spring 5 and bearing retainer 3. Numeral 10 points to a lower spring mounted between bearing retainer 3 and the lower diameter portion of cylinder 4. Thrust bearing 8 and spring catcher 9 are provided between bearing retainer 3 and lower spring 10.

Referring to FIG. 4, the operation of the present invention as regards the linear motion aspects is as follows.

Figure 1:
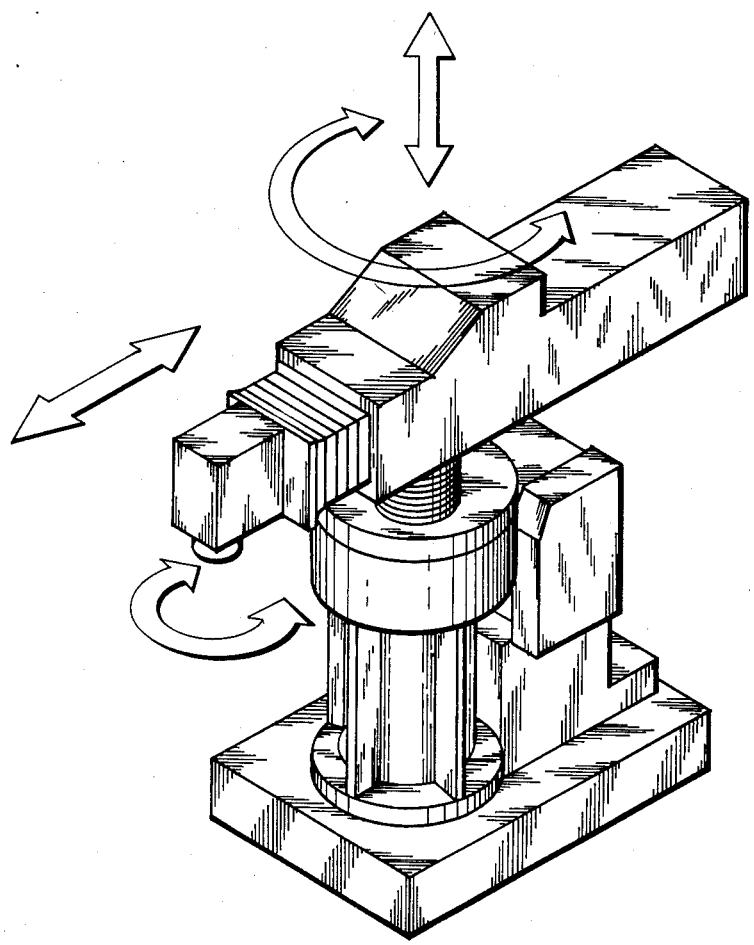
FIG. 1 is a perspective view of a cylindrical coordinate type industrial robot which utilizes a bearing that simultaneously supports both linear movement and rotational movement through the supporting mechanism of the present invention.
Figure 2:
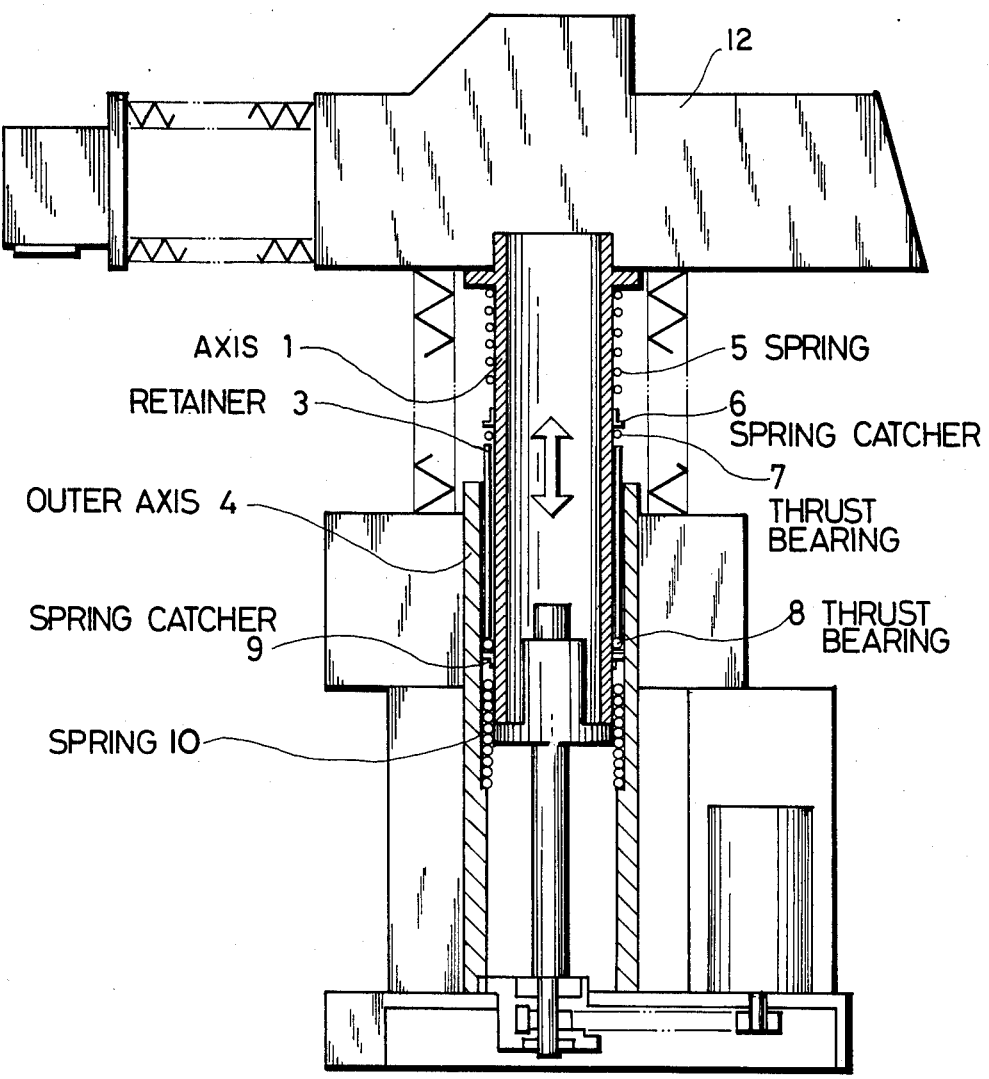
FIG. 2 is a sectional diagram of the vertical axis of the cylindrical coordinate type industrial robot shown in FIG. 1.
Figure 3:
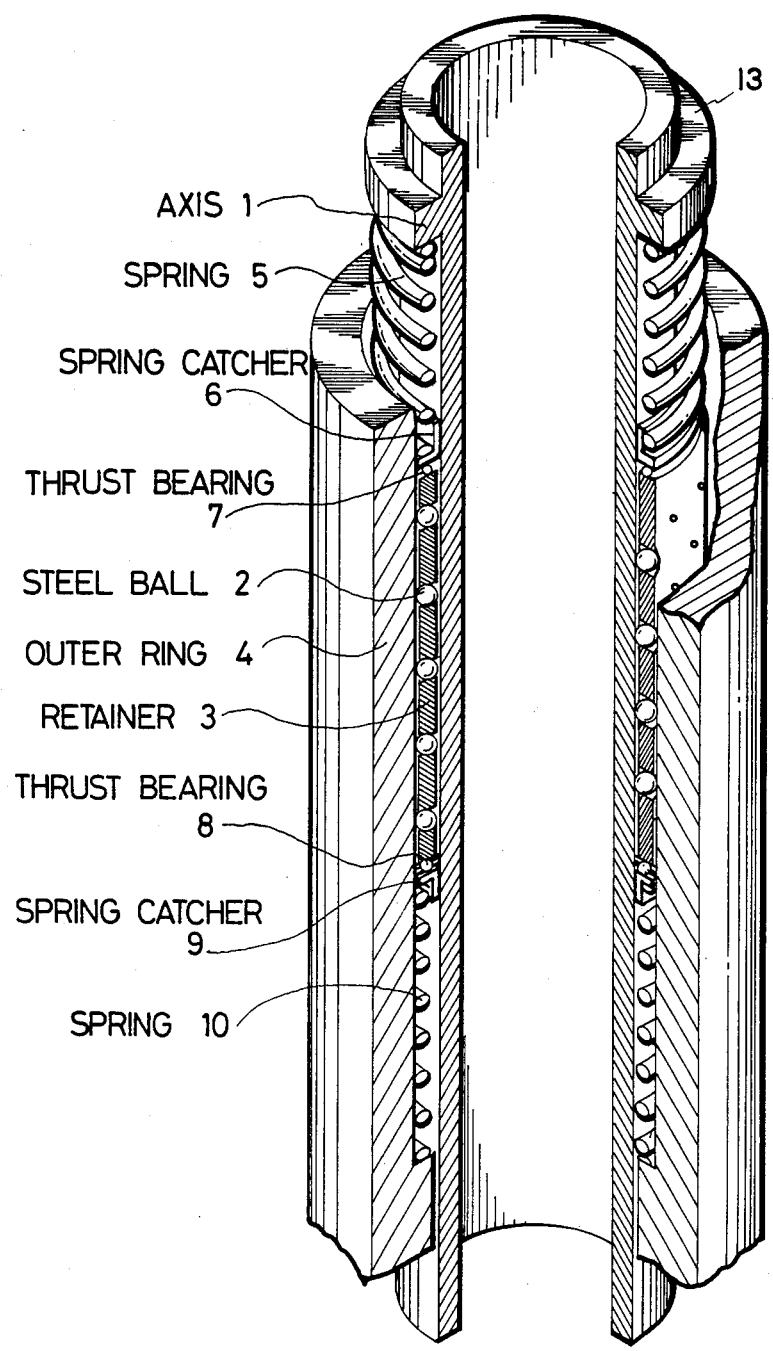
FIG. 3 is a perspective view of the bearing portion which support both the linear movement and the rotating movement utilized on the vertical axis shown in FIG. 2.

Steel ball elements 2 and retainer 3 are transferred for half the amount of the distance that arm support tube 1 moves from the lower end to the upper end of the tube's translation distance. The translation distance of spring 5 and spring 10 is always equal in the translation or movement process to that tube of 1. Therefore, by equalizing the spring constant of springs 5 and 10, the power difference of springs 5 and 10 remains constant in the translation or movement process of tube 1. By equalizing this power difference with the combined weight of retainer 3 containing balls 2, the power becomes balanced, including the weight of steel balls 2 and retainer 3.

Thus, when retainer 3 containing steel balls 2 slips back down between tube 1 and outer tubular member 4 and thus a gap would otherwise be caused, and the power balance of springs 5 and 10 would be lost, it is clear that in accordance with the invention, the power to return steel balls 2 and retainer 3 to their proper positions is caused.

Referring to FIG. 4, the marks $F_A$, $F_A'$ $F_A''$ and $F_A'''$ represent the power created by springs 5, the marks $F_B$, $F_B'$, $F_B''$ and $F_B'''$ represent the power created by spring 10, and mark W shows the combined weight of steel ball 2 and of retainer 3.

As explained above, with the present invention, by controlling the power of springs 5 and 10 and each spring constant, the proper position of steel balls 2 and of retainer 3 can be established and maintained, and the gap that would otherwise be created (see FIG. 5) can be prevented. Therefore, there is no need to readjust the position of retainer 3 which in the prior art gets out of its place by the gap distance, and its technical and economical effect is apparent.

Also, by providing thrust bearing 8 at springs 5 and 10, there will be no torsional force caused by the relative rotational motion of tubes 1 and ouf outer tubular member 4. Thus, stabilized power can be forced onto the retainer 3 without any effects such as would be caused by torsional force, and the position of retainer 3 can be maintained steadily, and its technical effect is thus apparent.

What is claimed is:

1. A supporting mechanism for supporting an industrial robot arm and the like comprising: a stationary upstanding tubular outer member; a displaceable inner member supported within the outer member to undergo axial displacement in upward and downward directions and angular displacement in clockwise and counter-clockwise directions; bearing means interposed between the inner and outer members for supporting the inner member to undergo axial and angular displacement, the bearing means comprising a retainer member rollably retaining thereon a plurality of rollable elements, the retainer member being interposed between the inner and outer members with the rollable elements in rolling contact with opposed surfaces of the inner and outer members thereby supporting the inner member to undergo axial and angular displacement; and elastic balancing and restoring means for applying elastic biasing forces in opposite axial directions to the upper and lower ends of the retainer member, the oppositely directed elastic biasing forces having a predetermined force difference therebetween effective to counterbalance the combined weight of the retainer member and rollable elements so that up and down displacement of the inner member normally effects proportionate up and down displacement of the retainer member, the elastic balancing and restoring means being operative in the event the retainer member fails to maintain proportionate displacement with the inner member to temporarily increase the magnitude of the force difference between the oppositely directed elastic biasing forces in a direction effective to restore the proportionate displacement.

2. A supporting mechanism according to claim 1; wherein the elastic balancing and restoring means includes means for applying a downward elastic biasing force to the upper end of the retainer member and an upward elastic biasing force to the lower end of the retainer member, the upward force normally having a magnitude approximately equal to that of the lower force plus the combined weight of the retainer member and rollable elements.

3. A supporting mechanism according to claim 2; wherein the means for applying downward and upward elastic biasing forces comprises spring means for applying downward and upward spring forces.

4. A supporting mechanism according to claim 2; wherein the means for applying downward and upward elastic biasing forces comprises an upper compression spring interposed between the upper end of the retainer member and the inner member for exerting a downward spring force on the retainer member, and a lower compression spring interposed between the lower end of the retainer member and the outer member for exerting an upward spring force on the retainer member.

5. A supporting mechanism according to claim 4; including means for preventing twisting of the upper and lower compression springs during angular displacement of the inner member.

6. A supporting mechanism according to claim 5; wherein the means for preventing twisting comprises thrust bearings interposed between the upper compression spring and the upper end of the retainer member and between the lower compression spring and the lower end of the retainer member.

7. A supporting mechanism according to claim 1; including means for preventing twisting of the elastic balancing and restoring means during angular displacement of the inner member.

* * * * *